United States Patent [19]

Maringer

[11] 4,123,935

[45] Nov. 7, 1978

[54] TESTING METHOD FOR A RECIPROCATING INTERNAL COMBUSTION ENGINE

[75] Inventor: Albert Maringer, Karlsruhe, Germany

[73] Assignee: Siemens Aktiengesellschaft, Berlin and Munich, Germany

[21] Appl. No.: 818,063

[22] Filed: Jul. 22, 1977

[30] Foreign Application Priority Data

Jul. 28, 1976 [DE] Fed. Rep. of Germany ....... 2633908

[51] Int. Cl.$^2$ .......................................... G01M 15/00
[52] U.S. Cl. ..................................................... 73/116
[58] Field of Search .................................. 73/116, 117.3

[56] References Cited

U.S. PATENT DOCUMENTS 3,972,230  8/1976  Hanson et al. ........................ 73/116

Primary Examiner—Anthony V. Ciarlante
Attorney, Agent, or Firm—Kenyon & Kenyon, Reilly, Carr & Chapin

[57] ABSTRACT

A testing method for a reciprocating internal combustion engine, in which values of the angular velocity are measured over an angular range of approximately 32° about the top dead center while the engine is running under its own power and at a predetermined speed, and are compared with values of the angular velocity for an entire revolution, and in which the ratio so determined is compared with a similar angular velocity ratio present for an engine of the same engine type at the same speed and with the engine running perfectly.

4 Claims, 2 Drawing Figures

TESTING METHOD FOR A RECIPROCATING INTERNAL COMBUSTION ENGINE

BACKGROUND OF THE INVENTION

This invention relates to internal combustion engines in general and more particularly to a testing method for a reciprocating piston internal combustion engine, using an angular velocity mesurement about top dead center.

In German Offenlegungschrift 23 50 363, a circuit arrangement for measuring the uniform running of an internal combustion engine in which the individual pistons of a reciprocating engine traverse a predetermined crank angle range about top dead center of the corresponding piston is described. The measurement is performed with the ignition suppressed and the engine driven externally by the starter motor. It gives information regarding the compression of the individual pistons. For this purpose, the times in which the different pistons of the engine traverse the fixed angular range about the top dead center, must be compared with each other or with a standard value.

The known arrangement thus serves to test for one given function of the engine, the compression. In contrast thereto, determining the overall operational fitness of a reciprocating piston engine is of primary importance with the present invention. From economic considerations, there is a need for a measuring method which can provide an overall statement as to whether an engine under test is operating properly or whether it should be tested in further examination steps for individual defects. With methods now in use, all intact test pieces, i.e., engines, are found to be in order only after a series of individual tests. It is more economical to have this preceded by a general test which distinguishes the defective test pieces from the good ones.

SUMMARY OF THE INVENTION

The present invention is based on the discovery that the nonuniformity of the angular velocity of a reciprocating internal combustion engine represents an operating parameter in which all processes of power generation and distribution with the engine are reflected. Each engine has a type-related nonuniformity of the angular velocity which depends on the speed, the number of cylinders, the design, the compression and several other parameters.

It is thus an object of the present invention to made available a testing method which utilizes the nonuniformity of the angular velocity, as an operating parameter, of a reciprocating internal combustion engine to give information regarding the operating performance or the condition of an engine.

According to the present invention, this testing method is characterized by the feature that values of the angular velocity are measured over an angular range of approximately 32° about the top dead center, while the engine is running under its own power and at a predetermined speed, and are compared with measured values of the angular velocity for an entire revolution, and that, subsequently, the determined ratio is compared with a similar angular velocity ratio for the same engine type present at the same speed and with the engine running perfectly.

By means of the method according to the present invention, whether the engine is operating properly or whether it must be examined for ignition, carburation or other individual functions, is determined in a simple manner. A separation into good and defective engines can therefore already be made before expensive individual test procedures are applied.

In the design of reciprocating piston engines, the term "coefficient of irregularity" is generally defined as the quotient of the difference between the maximum and the minimum peripheral crank velocity divided by a mean peripheral velocity. Particularly in the case of reciprocating engines which are used to drive electric generators, this operating parameter is important to ensure synchronization of the voltage delivered by the generator with the line voltage. It has been found that for the testing purposes intended here, it is not this known coefficient or irregularity which must be used, which can be measured only with considerable effort, but that it is sufficient to compare an angular velocity about top dead center with a mean angular velocity for an entire revolution. Many possible defects of a reciprocating internal combustion engine such as, for instance, lack of compression, poor carburator performance, faults in the ignition, etc., manifest themselves particularly through changes in the angular velocity around top dead center.

The testing method can be applied separately for each individual cylinder. However, it is also possible to make the test only for a pilot cylinder.

The measurement of the angular velocity in an angular range of about 32° of the crank shaft about top dead center can be performed, for instance, by the known two marker method. Here, two markers are provided on the flywheel with a mutual angular spacing of 32° of the crank shaft. The markers can be sensed inductively or opto-electrically. The time which passes in traversing the two markers can be measured by a clock generator and a counter and yields a value for the angular velocity about top dead center. If, in addition, the time for a complete revolution is measured, a mean angular velocity can be obtained from it. Both numbers, available in digital form, can then be compared as a ratio in a dividing device and compared in a digital comparator with a predetermined nonuniformity of the angular velocity with the engine intact. A display device can indicate the result as "good" or "bad" to the test personnel by a printout or a simple visual yes/no indication.

BRIEF DESCRIPTION OF THE INVENTION

DETAILED DESCRIPTION OF THE INVENTION

Figure 1:
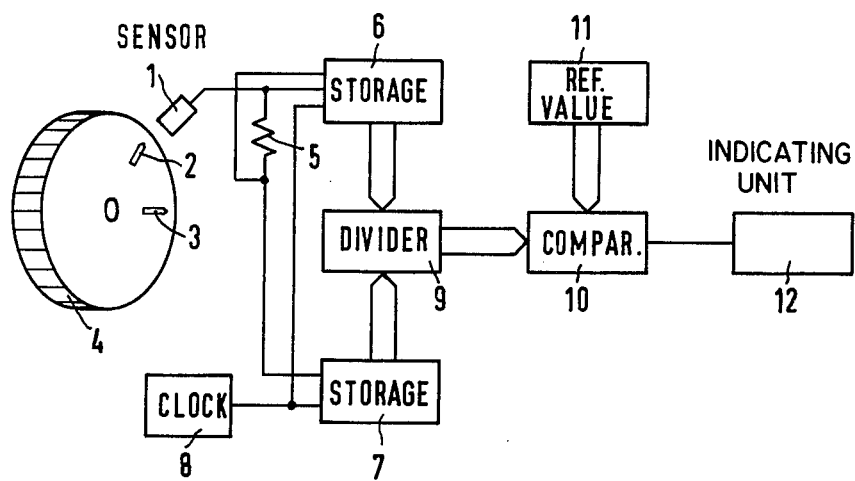
FIG. 1 is a block diagram of a system of the present invention.

In the system of FIG. 1, a sensor 1 scans two markers 2 and 3, which are located on the flywheel 4 of an engine, which is not shown. A discriminator 5 always picks up only the signal of the marker 2. The outputs of the sensor 1 and the discriminator 5 control inputs of two result storage devices 6 and 7, the counting inputs of which are driven by the output of a clock generator 8. The bit outputs of the result storage devices 6 and 7 are connected to corresponding bit inputs of a dividing device 9. The bit outputs of the dividing device 9 are connected to inputs of a digital comparator 10, to the reference inputs of which corresponding outputs of a reference value storage means 11 are connected. In the reference value storage means 11, a value for the irregularity present at a given speed with the engine intact is stored. An indicating unit 12 by which the result of the comparator is discriminated and indicated as "good" or "bad" is connected to an output of the comparator 10.

Figure 2:
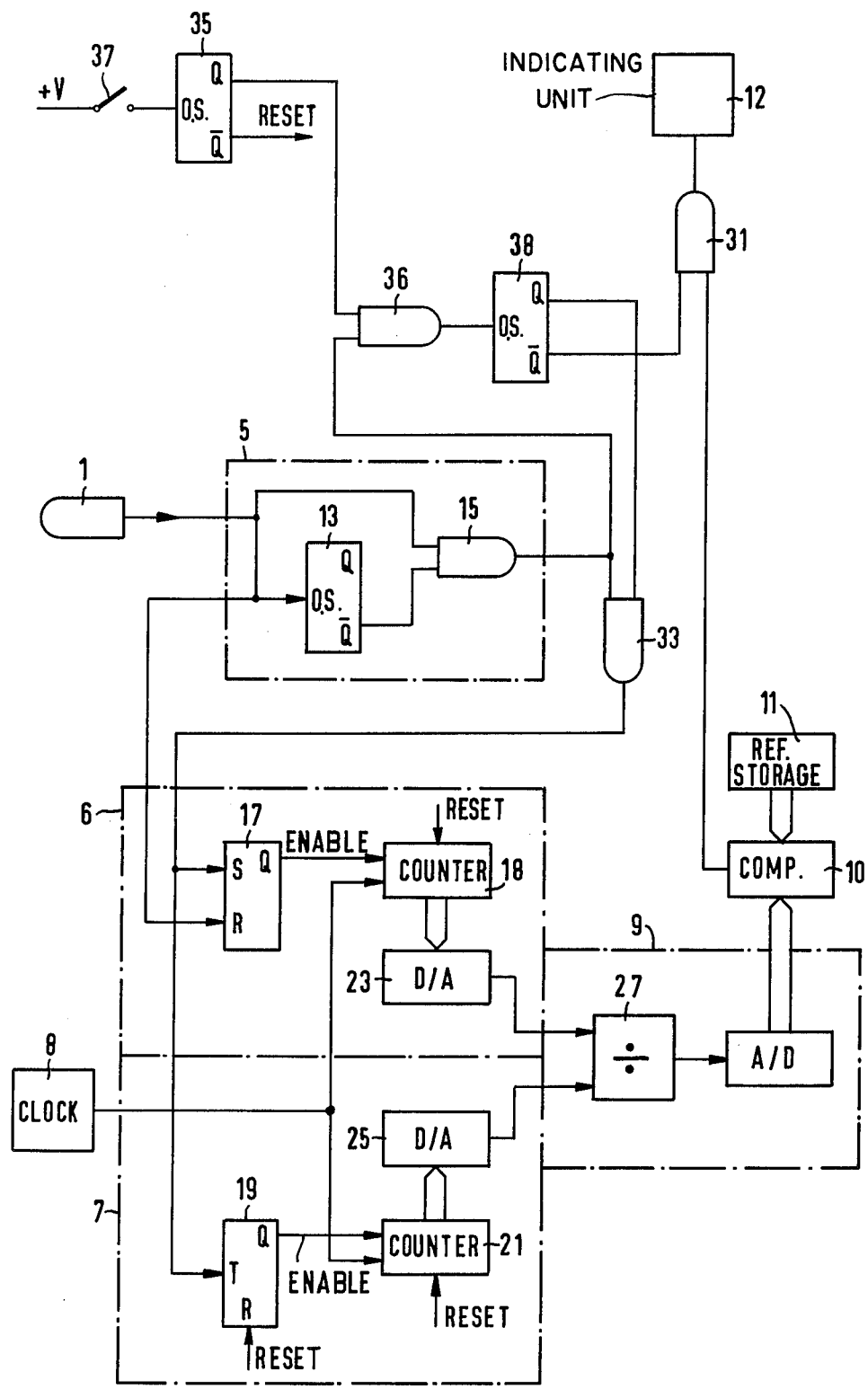
FIG. 2 shows more details of the system of FIG. 1.

FIG. 2 illustrates in more detail a possible implementation of the system shown on FIG. 1. The two marks 2 and 3 can be made of different widths, the width of the marker 2 being greater than that of marker 3. The discriminator 5 is shown as comprising a one shot multi-vibrator 13 and an AND gate 15. The sensor output on the leading edge of the mark 2 fires the one shot 13. It has a delay time which is less than the time required to traverse the mark 2 at the predetermined speed, but greater than the time required to traverse the mark 3. When it is triggered, its $\overline{Q}$ output will go to a 1 and its Q output to a 0. The sensor, since it has an output will be at the 1 level. If the sensor signal is still present when the one shot goes back to its quiescent state and $\overline{Q}$ becomes a 1, an output will appear from the AND gate 15. Such will only occur if the larger mark 2 is encountered. This output is coupled through an AND gate 33 as a set input to a flip-flop 17. The Q output of flip-flop 17 is an enable input to a counter 18. The flip-flop 17 is reset by the leading edge of the sensor output and thus will be reset when the sensor encounters the mark 3. Thus, the counter will be enabled only during the space between the marks 2 and 3, and will store a digital value therein proportional to the time required to traverse those two marks. The output of gate 15 is also coupled as a trigger input to a flip-flop 19 which forms part of the storage means 7. Thus, each time the mark 2 is encountered, this will be triggered. Thus, the Q output will appear for one complete rotation of the flywheel 4 so as to store in the counter 21 a value proportional to the time required to form one complete rotation. The divider 9 can include digital to analog converters 23 and 25 coupled respectively to the outputs of the counters 18 and 21, the outputs of the digital to analog converters coupled into an analog divider 27, the output of which is reconverted into digital form by an analog to digital converter 29. Alternatively, the whole division could be implemented digitally if, for example, a microprocessor were available. The output of the comparator is coupled to the indicator through an AND gate 31. This, and AND gate 33 are enabled by the outputs of a one shot multi-vibrator 38 adapted to trigger in response to the output of AND gate 36. AND gate 36 has as inputs the output of gate 15 and of a one shot 35 responsive to a push button switch 37. The $\overline{Q}$ output of the one shot 35 is also a reset input which is coupled into the counters 18 and 21 and flip-flops 17 and 19. The time period of the one shot 35 and of one shot 38 are each slightly greater than the time required to make one complete revolution at the predetermined speed. Thus, to initiate the test, the push button 37 is pushed. The counters and flip-flops are selected to be ones which will reset on the falling edge of a pulse so that as the $\overline{Q}$ output goes from 1 to 0, the counters and flip-flops will be reset. The Q output of the one shot 35 going to a high level enables the gate 36 so that when the marker 2 is sensed, gate 36 triggers one shot 38 to enable gate 33. When this happens, flip-flop 17 is set and countered 18 begins counting and counts until the marker 3 is encountered. The counter 21 counts from the first time the marker 2 is encountered until the second time it is encountered. The values in the counters now represent the desired values and consequently, the input to the comparator 10 from the analog to digital converter 29 represents the desired ratio and the output thereof accurately represents the desired comparison. Shortly after passing the marker 2 from the second time, the state of the one shot multi-vibrator 38 changes. The detected output at gate 33 is now disabled and the $\overline{Q}$ output of the one shot 38 enables the gate 31 so that an indication of the comparison that was made is available.

I claim:

1. A method for testing reciprocal internal combustion engines using an angular velocity measurement about top dead center comprising:
   (a) measuring the time to traverse an angular range of approximately 32° about top dead center, which time will be inversely proportional to the angular velocity over said angular range of approximately 32° about top dead center;
   (b) measuring the time required for an entire revolution, which time will be inversely proportional to the angular velocity for an entire revolution, both of said values being determined with the engine running under its own power and at a predetermined speed;
   (c) finding the ratio of said two times; and
   (d) comparing said ratio with a similar ratio present for the same engine type at the same speed with the engine functioning perfectly.

2. The method according to claim 1 wherein said measurements are made separately for each cylinder.

3. The method according to claim 1 wherein said measurements are made only for a pilot cylinder.

4. The method of claim 1 wherein said step of measuring the time to traverse approximately 32° about top dead center comprises placing two marks, on opposite sides of top dead center and subtending an angle of approximately 32°, on an accessible rotating part of the engine, disposing a sensor opposite the part of the engine to which said marks are fixed; detecting the passage of said marks and finding the time between the sequential passage of said marks and wherein said step of measuring time required for an entire revolution comprises sensing the time between two successive detections of one of said marks by said sensor.

* * * * *